Figure 1:
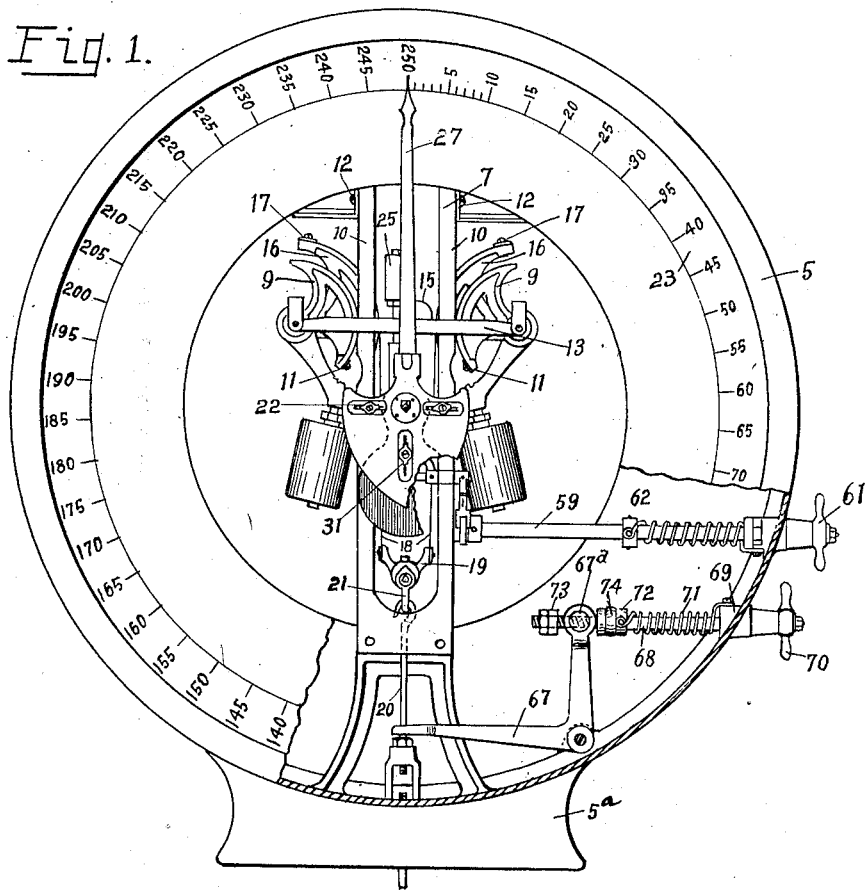

H. O. HEM.
WEIGHING SCALE.
APPLICATION FILED AUG. 14, 1916.

1,348,174.

Patented Aug. 3, 1920.
4 SHEETS—SHEET 1.

WITNESSES:
D. C. Walter
H. L. Whitney

INVENTOR.
Halvor O. Hem
by George R. Frye
Attorney

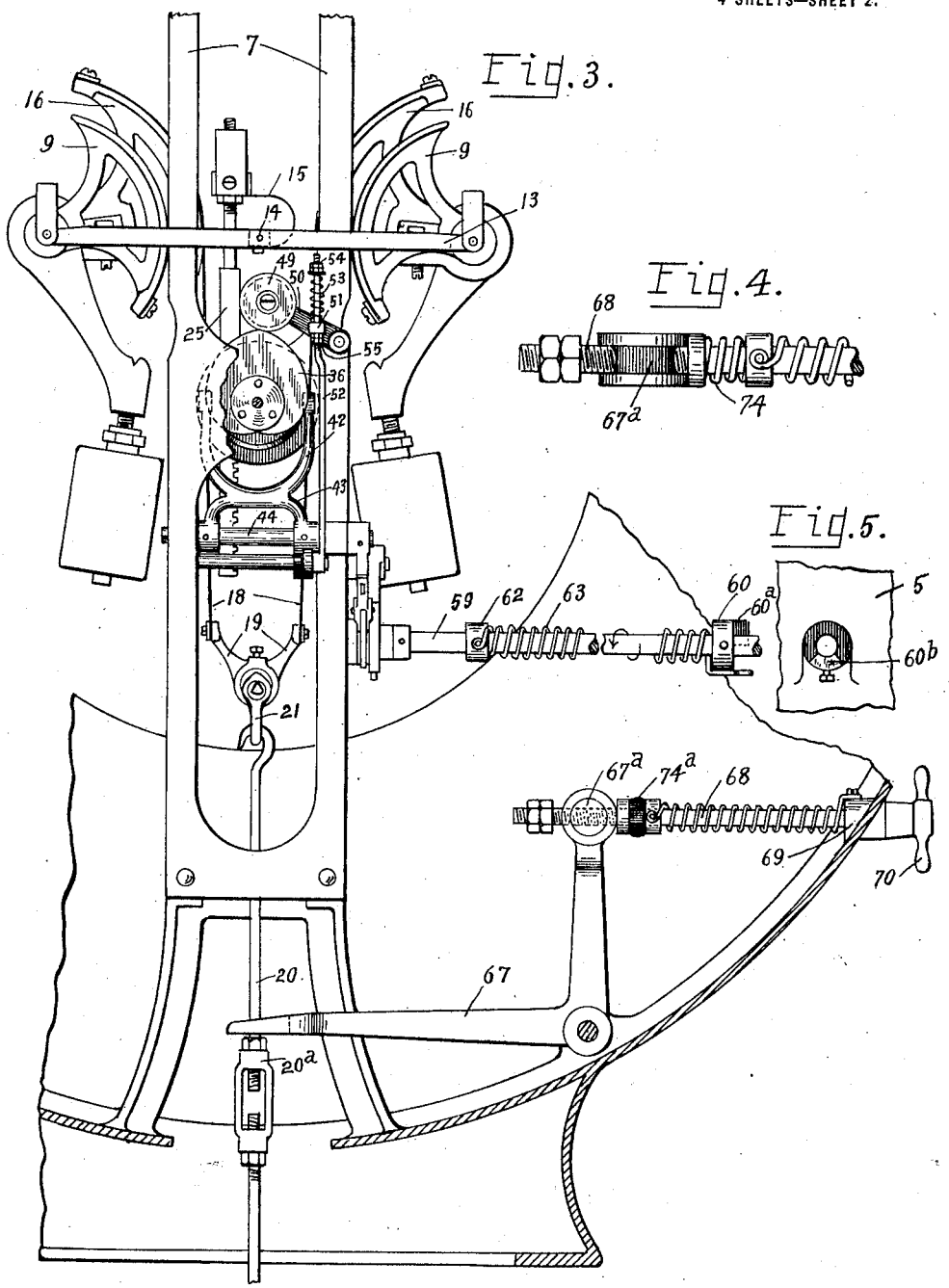

H. O. HEM.
WEIGHING SCALE.
APPLICATION FILED AUG. 14, 1916.
1,348,174.
Patented Aug. 3, 1920.
4 SHEETS—SHEET 3.
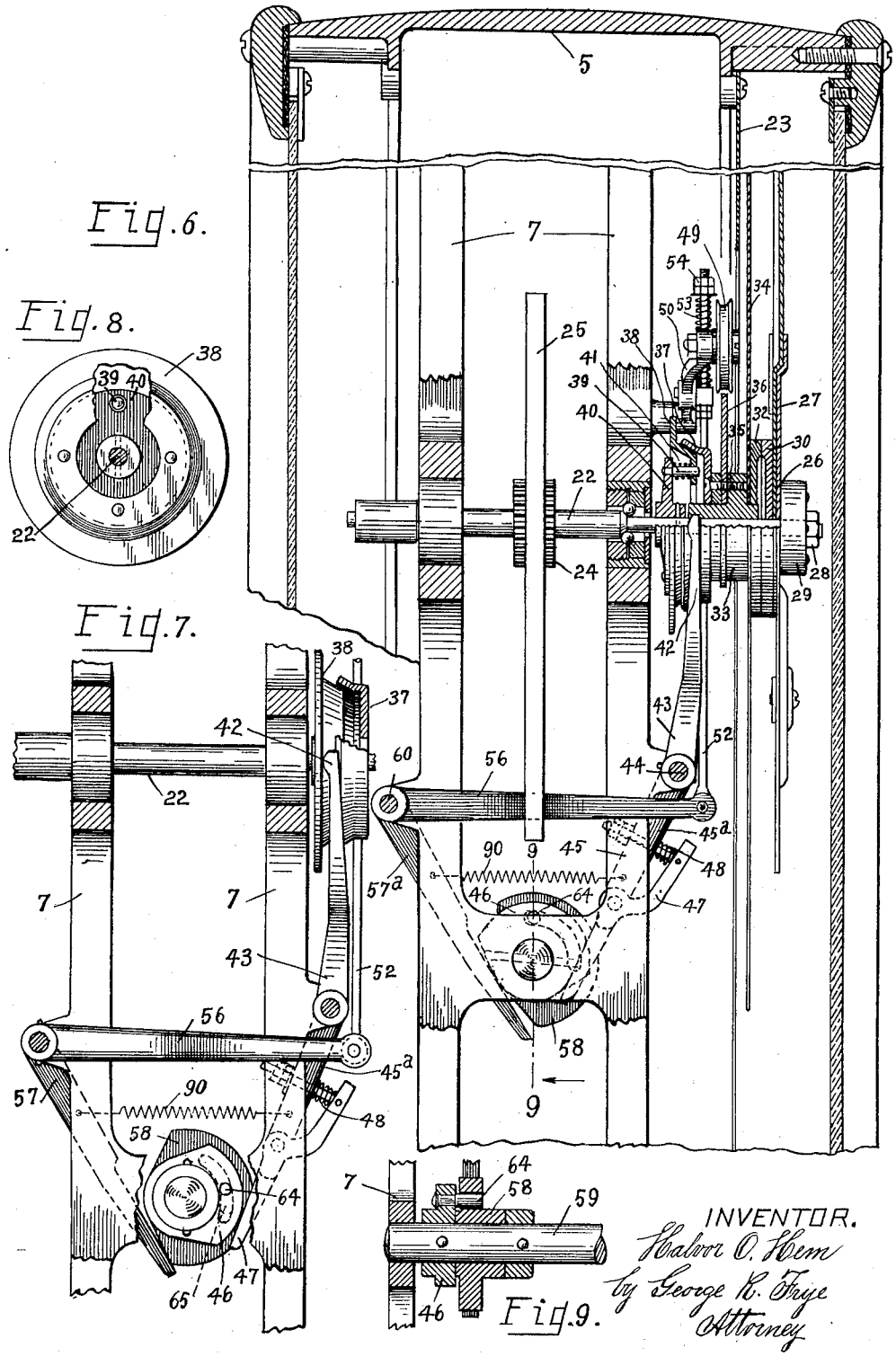

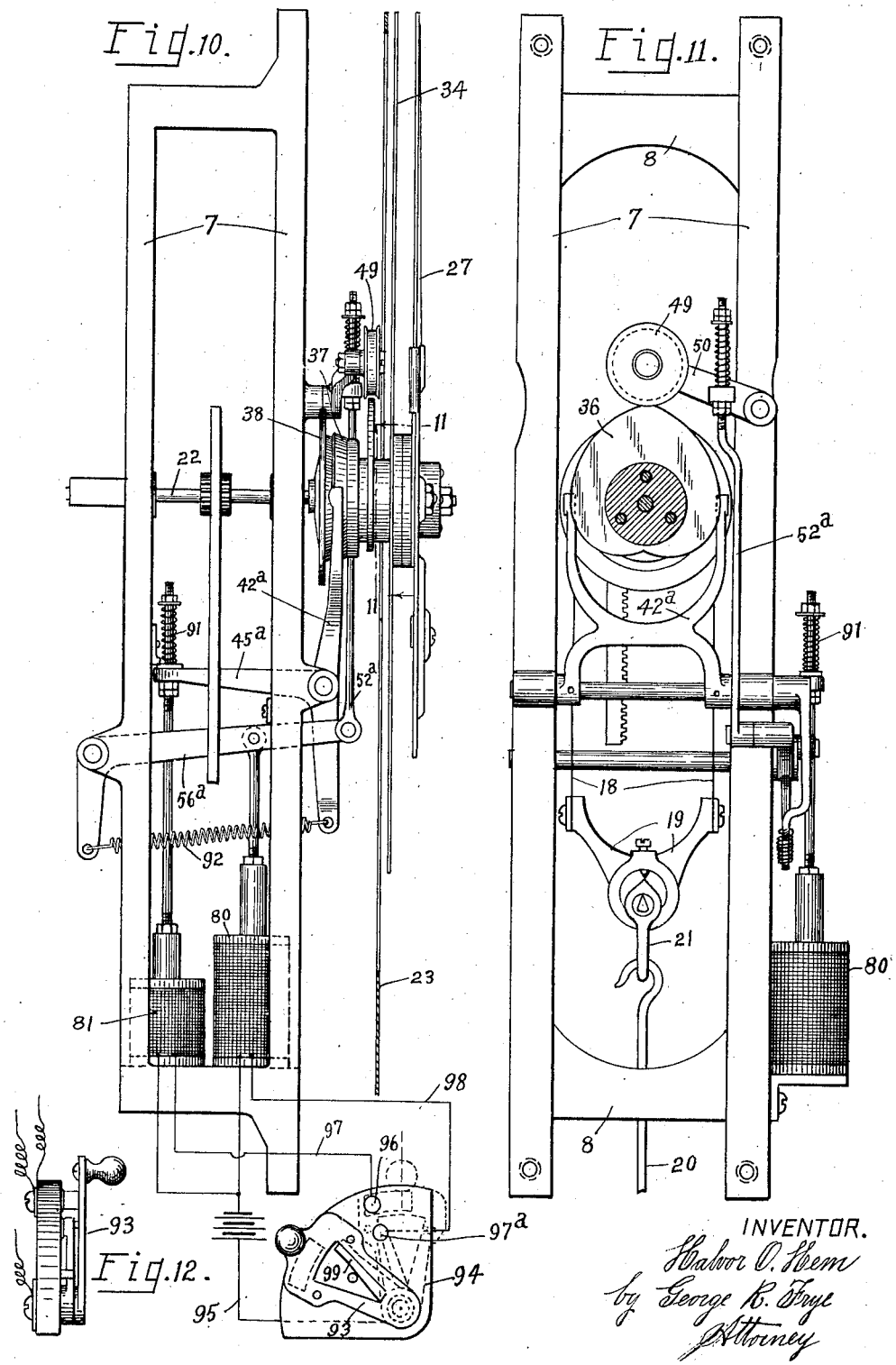

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING-SCALE.

1,348,174.   Specification of Letters Patent.   Patented Aug. 3, 1920.

Application filed August 14, 1916. Serial No. 114,786.

*To all whom it may concern:*

Be it known that I, HALVOR O. HEM, a citizen of the United States, residing at Toledo, in the county of Lucas and State of Ohio, have invented certain new and useful Improvements in Weighing-Scales, of which the following is a specification.

This invention relates to weighing scales, and has for its primary object the provision of a scale having indicating means arranged to conveniently and accurately indicate the net, gross and tare weights of articles being weighed, so that all of these various weights can be immediately ascertained by the operator.

This invention also provides means for indicating multiple weighings, wherein packages or articles may be separately weighed without necessitating the removal of any of them from the scale platform until all have been weighed, thereby enabling the operator to keep together and intact an invoice of goods for delivery or shipment; or for accurately weighing the several ingredients that enter into a compound of medicine, alloy, etc., the compounding of which may be performed without necessitating the removal of the container or holding vessel from the scale platform.

A further object of this invention is to provide a scale having a plurality of indicator hands positioned and arranged to act together to indicate the weight of articles placed upon the scale platform, one or more of said indicating hands being adjustable relatively to the other or others of said indicator hands, enabling the operator to shift one or more of the indicator hands from any desired position without disturbing the position of the remaining indicator hands.

A further object of the invention is to provide a scale that, while well adapted to indicate net, gross and tare weights, may be also used as an ordinary weighing scale, indicating in the usual manner only the gross weight of an article placed upon the scale platform, the mechanism utilized for converting the scale into a net, gross and tare weigher being independent of the weighing mechanism of the scale itself.

With the above the other objects in view which will more readily appear from the following description, my invention consists of the novel construction, combination and arrangement of parts hereinafter more fully described and particularly pointed out in the subjoined claims.

Reference is to be had to the accompanying drawings illustrating preferred embodiments of my invention, and wherein similar reference numerals designate similar parts throughout the several views.

In the drawings:—

Figure 2:
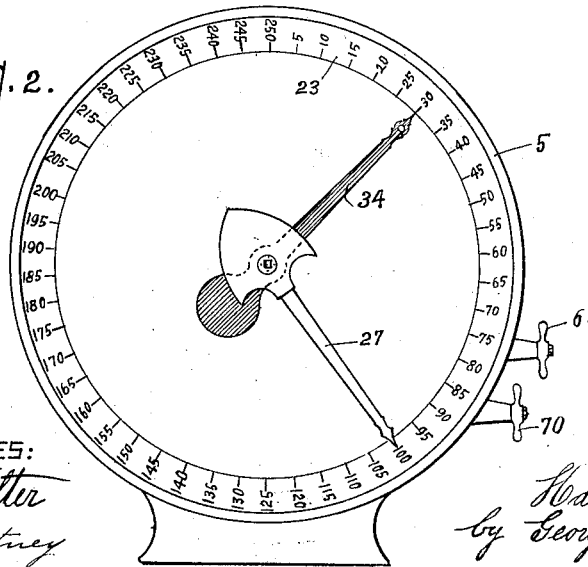

Figure 1 is a front elevation, with parts broken away, of the upper portion of a weighing scale embodying one form of my invention, the plurality of indicator hands being alined at zero position; Fig. 2 is a front elevation of the dial portion of my improved scale with the indicator hands in position to indicate net, gross and tare weights; Figs. 3, 4 and 5 are enlarged detail views of the weighing and indicating mechanisms of the embodiment shown in Fig. 1; Figs. 6 and 7 are enlarged detail elevations, with parts in section, of this embodiment; Fig. 8 is a detail elevation, with parts broken away, of part of the friction clutch mechanism employed; Fig. 9 is a detail sectional view taken on the line 9—9 of Fig. 6; Fig. 10 is a side elevation of the indicating mechanism embodying another form of my invention; Fig. 11 is a front elevation, with parts in section, taken on the line 11—11 of Fig. 10; and Fig. 12 is a detail side elevation of the switch employed.

In the drawings, the numeral 5 designates a scale housing adapted to inclose the weighing mechanism of the scale, having a neck $5^a$ adapted to be supported upon a suitable column (not shown), the lower end of which is associated with the platform of the scale in the usual manner. The weighing mechanism of the scale in the embodiments herein shown comprises a rectangular frame having four vertical pillars 7 suitably supported from the wall of the scale housing and secured together at top and bottom by cross-pieces 8. The pillars 7, as herein shown, form bearings or tracks for rocker segments 9 (Fig. 1) which have rolling contact thereon, being supported in position by flexible ribbons 10 of steel or other suitable material fastened to the lower ends of the segments, as at 11, and at their upper ends to the pillars, as at 12, being thus interposed between the pillars and segments at every position of the latter. The segments 9 are suitably secured in a vertically-movable frame 13, which serves to connect the several segments with each other, and through the medium of the pivotally mounted central rod 14 and the resilient connecting member 15 with the indicating mechanism of the scale. Arranged adjacent the supporting segments 9 are larger segments 16 which are also suitably mounted in the vertically-movable frame 13, said segments extending at their periphery between the pillars 7 at the opposite sides of the rectangular frame and are connected at their upper ends, as at 17, to metallic ribbons 18 which pass over the arcuate faces of the segments and are attached at their lower ends to an equalizer bar 19, as clearly shown in Fig. 1. The equalizer bar 19 is suitably connected, as by means of a steelyard rod 20 and U-shaped links 21, to the platform levers (not shown) supporting the scale platform. The steelyard rod 20 is preferably made adjustable with upper and lower links connected by a turnbuckle 20$^a$. It is to be understood that any suitable platform or platform lever mechanism may be employed in connection with the weighing mechanism of the scale, the weighing mechanism herein shown being designed to operate when employed in various forms of scales.

It is also to be understood that this invention is not necessarily restricted to use with weighing mechanism of the character herein shown, any suitable mechanism arranged to counter-balance a load placed on the scale platform and accurately drive an indicator shaft through a proportionate arc to indicate the weight thereof being capable of use in connection with my invention, various mechanisms well-known in the scale art being fully capable of performing the required functions. The embodiment herein illustrated has, however, been found to successfully demonstrate the capabilities of this invention, and it is therefore illustrated as a preferred form of weighing mechanism.

An indicator shaft 22 is mounted concentrically of the dial 23 and carries a pinion 24 (see Fig. 6) arranged to mesh with a vertically-disposed rack 25 connected by the resilient connecting member 15 to the vertically-movable frame 13. At its forward extremity the indicator shaft 22 is reduced, as shown in Fig. 6, and carries the hub 26 of a fixed indicator hand 27, the hub 26 being secured by a key and lock nut 28 or in any other desired manner. The hub 26 is formed with a circular flange 30 coöperating with the collar 29 in positioning the indicator hand 27, which hand is preferably formed of sheet metal and adjacent its pivotal point is expanded into a plate which is appropriately slotted, as at 31, (Fig. 1), to receive small adjustable weights for accurately counter-balancing the hand.

The flange 30 is adapted to normally contact with a similar flange 32 fixed upon the hub 33 of an adjustable indicator hand 34, the contacting faces of the flanges 30 and 32 aiding in effecting simultaneous rotation of the fixed and adjustable indicator hands from the weighing mechanism. The hub 33 is loosely mounted upon the reduced portion of the indicator shaft 22 so as to be rotatable thereon and is detachably connected with said shaft through the medium of a friction clutch mechanism presently to be described. As herein constructed, the hub 33 is provided with a peripheral flange 35 to which are secured a heart-shaped cam 36 and a cupped friction disk 37, as clearly shown in Fig. 6. The friction disk 37 is adapted to coöperate with the friction disk 38 secured to the shaft 22 through the following mechanism: A plurality of studs 39 extending forwardly from the spider 40 pinned or otherwise secured to the indicator shaft 22 enter apertures formed in the disk 38 to impart rotative motion thereto while coil springs 41 surrounding the studs 39 allow for sliding motion of the disk 38 and normally maintain the clutch disks 37 and 38 in contact. The disk 38 is extended at its periphery beyond the active clutch face to provide a flange for contact with the bifurcated upper arm 42 of the clutch-throwing lever 43, which is pivoted, as at 44, upon the pillars 7, and provided with a downwardly-extending arm 45 adapted to be engaged by the clutch-throwing cam 46 to trip the lever. As herein shown, the arm 45 is formed with a fixed portion 45$^a$ to which is pivoted a contact lever 47, one arm of which is arranged to engage the face of the cam 46 and the other arm is normally pressed outwardly by a coil spring 48 extending between said arm and the fixed portion 45$^a$. When the clutch-throwing lever 43 is tripped, the contact faces of the bifurcated arms 42 will engage the disk 38 on opposite sides of its center, serving to first stop rotative movement of said disk, and then when further pressure is applied to the lever to move the disk 38 out of engagement with the companion friction disk 37. This sliding movement of the disk 38 is made against the pressure of the coil springs 41 and the combined pressures exerted by the springs 41 and lever 43 provide an effective locking engagement of the disk and lever so as to securely hold the disk 38 and the indicator shaft 22 connected thereto against rotative movement, thus locking the fixed indicator hand 27 in any adjusted position whenever desired.

The means for independently rotating the indicator hand 34 while the indicator hand 27 is so locked will now be described. The peripheral edge of the heart-shaped cam 36 is adapted to be contacted by a grooved roller 49 pivotally mounted at the free end of an arm 50, the other end of which is pivoted upon the framework of the scale (see Fig. 3). An apertured bracket 51 is pivotally connected to the arm 50 intermediate its ends, the upper end of the vertically-disposed rod 52 extending through the aperture thereof and being maintained in spaced relation therefrom by the coil spring 53 arranged between the upper side of the bracket and an adjustable collar 54 on the rod. A similar adjustable collar 55 is preferably provided to normally engage the lower face of the bracket 51 to limit the upward movement of the rod. At its lower extremity the rod 52 is pivotally connected with the horizontally-disposed arm 56 of a bell-crank lever 57, the downwardly extending arm 57ª of which is adapted to be engaged by the face of the cam 58 loosely mounted on the same shaft 59 to which the clutch-throwing cam 46 is fixed, the bell-crank lever being pivoted, as at 60, upon the framework of the scale (see Fig. 6).

The heart-shaped cam 36 is so positioned and secured to the hub of the adjustable indicator hand 34 that the center point of the recess therein is adapted to be in engagement with the roller 49 when the adjustable indicator hand 34 points to zero on the dial 23. From this center point the heart-shaped cam extends equally on both sides to an apex diametrically opposite this recess, the curvature being such that the heart-shaped cam and the elements attached thereto will be rotated when the roller 49 is forcibly thrown into engagement with the edge of the cam. The rocking of the bell-crank lever throws the rod 52 downwardly and forces the roller 49 into engagement with the periphery of the heart-shaped cam, the spring 53 serving to maintain the engagement as long as the rod 52 is depressed. The pressure exerted rotates the heart-shaped cam and connected elements until the roller centers itself in the recess of the cam.

The means for rotating the cams 46 and 58 to trip the levers 43 and 57 respectively comprises a shaft 59 mounted at one end in bearings in the scale framework 7 and at the other end supported in bearings formed in the housing 5. A hand lever 61 is secured to this shaft on the outside of the housing. A collar 62 is preferably fixed to this shaft intermediate its ends, and carries one end of a coil spring 63, the other end of which is secured to the housing 5, so that as the shaft 59 is rotated to move the cams by grasping the handle 61 the spring 63 will be wound to a sufficient extent to automatically return the cams and shaft to their original positions when the handle 61 is released. A collar 60 secured to the shaft 59 adjacent the housing carries a projection 60ª adapted to contact with a lug 60ᵇ on the housing to limit the return movement of the shaft. The cam 46 adapted to engage the lower arm of the clutch-throwing lever is pinned or otherwise secured to the shaft 59 (see Fig. 9), while the cam 58 adapted to contact the arm 57ª of the heart-cam actuating mechanism is free on the shaft and is loosely connected with the cam 46 by means of a pin 64 on the cam 46 extending into a slot 65 in the cam 58. The arms 45 and 57ª are held in contact with the cams 46 and 58 by the light spring 90.

In the operation of the scale, when it is desired to utilize the scale as a net, gross and tare weight indicator, the container, such as a box or holding vessel, is first placed upon the scale platform, and the weighing mechanism will be actuated thereby to rotate the indicator shaft 22 and both indicator hands 27 and 34 through a sufficient arc to indicate on the dial 23 the weight of the container, both of the indicator hands being moved to the same point because of the fact that the clutch disk 38 fixed to the indicator shaft 22 is in close engagement with the friction disk 37 secured to the adjustable indicator hand 34, this being the normal position of the friction disks. One indicator hand is then locked in this position indicating the weight of the container, while the other indicator hand is returned to zero position in the following manner. The operator grasps the handle 61 and rotates the shaft 59 and cams 46 and 58 secured thereto. The cam 46 is rotated from the position shown in Fig. 6 toward the position shown in Fig. 7, and the clutch-throwing lever 43 is rocked before any movement is imparted to the cam 58 and the heart-cam actuating mechanism. In rocking the lever 43 the faces of the bifurcated arms 42 are thrown into contact with the friction disk 38, locking said disk and the indicator shaft 22 and fixed indicator hand 27 connected therewith against rotative movement. Further movement of the lever 43 then forces the disk 38 out of engagement with the companion friction disk 37, freeing the hub of the adjustable hand 34 from engagement with the fixed indicator hand 27 and indicator shaft 22. During this movement of the cam 46 and clutch-throwing lever 43 the pin 64 is moving within the curved slot 65 in the cam 58, which slot is of appropriate length to allow the requisite independent movement of the cam 46 before the pin 64 contacts with the end wall of the slot. The pin 64 engaging the end wall of the slot moves the cam 58 to rock the lever 57 to depress the rod 52 and the pivoted arm 50 to bring the roller 49 forcibly into engagement with the periphery of the heart-shaped cam 36 to thereby rotate the heart-shaped cam and the adjustable indicator 34 until said indicator hand again points to zero on the chart, which as above described, is exactly located by the recess of the heart-shaped cam. The handle 61 is then released by the operator and the coiled spring 63 rotates the shaft 59 and cams 46 and 58 to their original positions. In this return movement the cam 46 is first rotated independently of the cam 58 until the pin 64 has traveled the entire length of the slot 65, this independent movement of the cam 46 serving to so time the releases of the mechanisms that the clutch-throwing lever 43 is first released, allowing the friction disk 38 to move into engagement with the companion disk 37 to frictionally secure the adjustable indicator hand 34 to the indicator shaft before the heart-cam actuating means is released, the heart-cam actuating means serving meanwhile to hold the adjustable indicator hand at the exact zero position. The roller 49 is then released from engagement with the heart-cam 36 through the continued movement of the shaft 59 and the cam 58. The commodity to be weighed is then placed in the container, whereupon the hands 27 and 34 are again rotated simultaneously until the weight of the commodity is also offset, and the net weight of this commodity may be then read on the dial under the pointer of the adjustable indicator hand 34, which had previously been returned to zero position prior to the placing of the commodity on the scale, and the gross weight of the container and commodity may be read on the dial under the pointer of the fixed hand 27. The tare—i. e., the weight of the container—is, of course, shown between the fixed and adjustable hands.

The weighing of articles can readily be continued without removing the articles already on the platform, as for example, the adjustable hand may be again returned to zero on the dial in the aforesaid manner, and a second commodity may be placed on the scale platform and the two hands will again be simultaneously moved, the adjustable hand 34 indicating on the dial the weight of the last article placed upon the platform, and the fixed hand 27 indicating the total of all the weight on the scale platform. This operation can be repeatedly performed until the full capacity of the dial has been reached, and in case the scale is also equipped with tare and increased capacity beams, the weights thus totaled can be transferred to the tare and increased capacity beams, thereby returning both the fixed and adjustable hands into registration with the zero graduation on the dial, and separate weighings and additions could be continued to the full weighing capacity of the scale.

To allow a plurality of containers of the same weight to be used, or the same container with various weights of commodities to be repeatedly used, I provide the following means whereby the indicator hand may be set to the desired position indicating the weight of the container without the actual placing of the container on the platform. A bell-crank lever 67 is pivotally mounted on the housing 5 of the scale (see Figs. 1 and 3), one arm of said lever being bifurcated at its free end and extending on opposite sides of the steelyard rod 20 immediately above the turnbuckle 20ª thereof, while the upper end of the other arm of the lever supports a rotatable member 67ª threaded to receive the screw-threaded extremity of the shaft 68, which is rotatively mounted in bearings 69 on the scale housing. A hand lever 70 is secured to this shaft outside the scale housing whereby the shaft may be rotated a sufficient distance to force the bifurcated arm of the bell-crank lever 67 into engagement with the turnbuckle on the steelyard rod 20 to force the rod downwardly a sufficient distance to actuate the weighing mechanism to move the indicator hands to the point on the dial indicating the desired weight of the container. The handle 61 is then grasped to lock the fixed indicator hand and return the adjustable indicator hand to zero position as above described, whereupon the two indicator hands are separated from each other a distance equivalent to the weight of the container. The pressure on the steelyard rod 20 is then removed, allowing the weighing mechanism to return to its original position, and in this return movement both indicator hands are simultaneously moved, the fixed indicator hand 27 being brought to zero position on the dial while the adjustable indicator hand is rotated back of zero a distance equivalent to the weight of the container. The weighings of various commodities in the container can then be readily effected, the two indicator hands being always separated a distance equivalent to the tare. To automatically return the lever 67 to its original position when the handle 70 is released, a coil spring 71 is secured at one extremity to a collar 72 fixed on the shaft 68 and at its other extremity to the bearing 69. The winding of the spring 71 during the setting of the indicator hand is sufficient to actuate the shaft 69 after the handle 70 is released to effect the return to initial position. Adjustable nuts 73 may be provided on the shaft 68 to limit the effective movement of the bell-crank lever 67, and a spring 74 or rubber bumper 74ª may likewise be provided to cushion the return movement of said lever, a collar or gasket being interposed between the bumper and the threaded arm of the lever.

In the modification shown in Figs. 10-12, means are provided for electrically actuating the clutch-throwing lever and the heart-cam actuating means. A pair of solenoids 80 and 81 have their cores respectively connected with levers 56ª and 45ª, the first-mentioned lever being pivotally connected with a rod 52ª actuating the heart-shaped cam through the medium of a grooved roller, while the lever 45ª is fixed to the bifurcated arms 42ª of the clutch-throwing lever, whereby the bifurcations may be brought into engagement with the friction disk 38. The core of the solenoid 81 is preferably loosely connected with the arm 45ª, and a light spring 91 is introduced between an adjustable collar on the upper end of the core rod and the arm, the spring 91 serving to relieve the impact against the disk 38 when the clutch-throwing lever is tripped and also to maintain pressure to hold the lever in engagement with the disk 38 while the lever is tripped. A light spring 92 is employed to connect the levers 56ª and 45ª to normally hold the bifurcated arm 42ª and the grooved roller away from the friction disk 38 and the heart-shaped cam respectively. The construction of the weighing mechanism, and the fixed and adjustable indicator hands are substantially identical with that above described in connection with the first modification. Suitable means may be provided for energizing the solenoids 80 and 81 when desired. In the illustrated embodiment a switch arm 93 is pivoted on a switch body 94, and a wire 95 is connected from the pivoted arm to a battery or other source of current supply and then with each of the solenoids 80 and 81. An insulated contact plate 96 mounted on the switch body substantially as shown in Fig. 10 is connected with the solenoid 81, as by the wire 97. This contact 96 is adapted to be engaged by a contact plate on the pivot arm 93 when said arm is swung, the dotted lines in Fig. 10 showing substantially the position assumed when the pivoted arm is in operative position. This completes the circuit to energize the solenoid 81 to retract its core and thereby trip the clutch-throwing lever, which, as in the first described modification, engages the disk 38 to prevent rotative movement of the indicator shaft 22 and the fixed indicator hand 27 and also slides the disk 38 away from its companion friction disk 37. A second contact 97ª is mounted upon, but normally insulated from, the switch body 94, and is connected, as by the wire 98, with the solenoid 81, this contact 97 being adapted to be engaged by a supplemental arm 99 pivotally mounted on the same center as the switch arm 93 and electrically connected therewith, this arm being adapted to be moved by the switch arm 93 coming into contact therewith after said arm has moved a portion of its swing, the switch arm then moving the supplemental arm 99 to bring it into engagement with the contact 97, as shown in dotted lines in Fig. 10. This closes the circuit to energize the solenoid 80 to retract its core to depress the rod 52ª, which swings the grooved roller 49 into engagement with the heart-shaped cam 36, to effect the action above described in connection with the first modification. The arrangement of the contact plate on the switch arm 93 with relation to the supplemental pivoted member 99 is such that the contact on said pivoted arm engages the contact 96 to close the circuit through the solenoid 81 before the supplemental arm 99 is moved into engagement with the contact 97 to close the circuit through the solenoid 80, so that the clutch-throwing mechanism is first actuated and later the heart-cam actuating mechanism. Similarly, the contact plate on the pivoted arm 93 breaks engagement with the contact 96 prior to the movement of the supplemental arm 99 from engagement with the contact 97, so that the solenoid 81 is first deënergized, to allow the clutch mechanism to be returned to normal position before the solenoid 80 is deënergized, so that the roller maintains engagement with the heart-shaped cam to hold the adjustable indicator hand in exact zero position until after the friction disk 38 has been returned into engagement with the companion friction disk 37. Suitable insulated stops are provided on the switch body 94 to limit the movement of the supplemental arm 99.

If it is desired to use the scale for ordinary weighing—i. e., for indicating only one weight of the article being weighed—the index hands will be simultaneously moved to indicate the weight desired on the chart, and since the necessity for providing means for separately indicating tare weight is now obviated, the adjustable hand 34 continues to act in conjunction with the fixed hand 27 to indicate as one composite pointer the weight of any article or articles placed on the scale platform.

While it will be apparent that the illustrated embodiments of my invention herein disclosed are well calculated to adequately fulfil the objects primarily stated, it will be understood that the construction is susceptible to modification, variation and change without departing from the spirit and scope of the invention as set forth in the subjoined claims.

Having described my invention, I claim:

1. In a scale and in combination with the load-offsetting mechanism thereof, a pair of indicator hands, connections for driving said hands from the load-offsetting mechanism, means for locking one of said indicator hands while permitting the movement of the other, and means set in motion simultaneously with the locking means adapted to contact the free hand for returning such hand to zero position after the first-mentioned hand is locked.

2. In a scale and in combination with the load-offsetting mechanism thereof, a plurality of indicator hands, connections for driving said hands from the load-offsetting mechanism, means for locking one of said indicator hands while permitting the movement of the others, and means actuated simultaneously with said locking means adapted to contact the free hands for returning such hands to zero position after the first-mentioned hand is locked.

3. In a scale and in combination with the load-offsetting mechanism thereof, a pair of indicator hands, connections for driving said hands from the load-offsetting mechanism, means for locking one of said indicator hands while permitting the movement of the other, and means actuated simultaneously with said locking means adapted to contact the free hand for returning such hand to zero position after the first-mentioned hand is locked.

4. In a scale and in combination with the load-offsetting mechanism thereof, a pair of indicator hands, connections for driving said hands from the load-offsetting mechanism, means for locking one of said indicator hands while permitting the movement of the other, a cam carried by the free hand, and means actuated simultaneously with said locking means to engage the cam for moving the free hand after the first-mentioned hand is locked.

5. In a scale and in combination with the load-offsetting mechanism thereof, a pair of indicator hands, connections for driving said hands from the load-offsetting mechanism, means for locking one of said indicator hands while permitting the movement of the other, a heart-shaped cam carried by the free hand, and means actuated simultaneously with said locking means to engage the cam for returning the free hand to zero position after the first-mentioned hand is locked.

6. In a scale and in combination with the load-offsetting mechanism thereof, a pair of indicator hands, connections for driving said hands from the load-offsetting mechanism, and means for locking one of said indicator hands while permitting the movement of the other, including co-acting clutch members carried by each of the indicator hands, a brake adapted to contact the clutch and separate the clutch members, and lever mechanism adapted to engage one of the indicator hands and move it relatively to the other.

7. In a scale and in combination with the load-offsetting mechanism thereof, a pair of indicator hands, connections for driving said hands from the load-offsetting mechanism, means for locking one of said indicator hands while permitting the movement of the other, including co-acting clutch members respectively carried by the indicator hands, a brake adapted to engage the clutch and disconnect the clutch members, a heart-shaped cam carried by the freed indicator hand, and means for engaging the heart cam to rotate the freed indicator hand relatively to the other hand.

8. In a scale and in combination with the load-offsetting mechanism thereof, a pair of indicator hands, connections for driving said hands from the load-offsetting mechanism, means for locking one of said indicator hands while permitting the movement of the other, including co-acting clutch members respectively carried by the indicator hands, a brake adapted to engage the clutch and disconnect the clutch members, a heart-shaped cam carried by the freed indicator hand, and lever actuating means for engaging the heart cam to rotate the freed indicator hand relatively to the other hand.

9. In a scale and in combination with the load-offsetting mechanism thereof, a pair of indicator hands, connections for driving said hands from the load-offsetting mechanism, and means for locking one of said indicator hands while permitting the movement of the other, including co-acting clutch members respectively carried by the indicator hands, a brake adapted to engage one of the clutch members and disconnect it from the other, a heart-shaped cam carried by the freed indicator hand, a roller adapted to contact the surface of the heart cam, and means for moving the roller to rotate the heart cam and freed indicator hand relatively to the other hand.

10. In a scale and in combination with the load-offsetting mechanism thereof, a pair of indicator hands, connections for driving said hands from the load-offsetting mechanism, and means for locking one of said indicator hands while permitting the movement of the other, including co-acting clutch members respectively carried by the indicator hands, a brake adapted to engage one of the clutch members and disconnect it from the other, a heart-shaped cam carried by the freed indicator hand, a roller adapted to contact the surface of the heart cam, and lever actuating means for moving the roller to rotate the heart cam and freed indicator hand relatively to the other hand.

11. In a scale and in combination with the load-offsetting mechanism thereof, a pair of indicator hands, connections for driving said hands from the load-offsetting mechanism, and means for locking one of said indicator hands while permitting the movement of the other, including co-acting clutch members respectively carried by the indicator hands, a brake adapted to engage one of the clutch members and disconnect it from the other, a heart-shaped cam carried by the freed indicator hand, a roller adapted to contact the surface of the heart cam, a pivoted lever carrying the roller adjacent one extremity, and means for swinging the lever forcibly into engagement with the heart cam to move said cam and the freed indicator hand relatively to the other hand.

12. In a scale and in combination with the load-offsetting mechanism thereof, a pair of indicator hands, connections for driving said hands from the load-offsetting mechanism, and means for locking one of said indicator hands while permitting the movement of the other, including co-acting clutch members respectively carried by the indicator hands, a brake adapted to engage one of the clutch members and disconnect it from the other, a heart-shaped cam carried by the freed indicator hand, a roller adapted to contact the surface of the heart cam, a pivoted lever carrying the roller adjacent one extremity, a rod connected to the lever between its pivot and the roller, a lever pivotally connected with said rod, and means for rocking said lever to draw the roller forcibly into engagement with the heart cam to rotate said cam and the freed indicator hand relatively to the other hand.

13. In a scale and in combination with the load-offsetting mechanism thereof, a pair of indicator hands, connections for driving said hands from the load-offsetting mechanism, and means for locking one of said indicator hands while permitting the movement of the other, including co-acting clutch members respectively carried by the indicator hands, a brake adapted to engage one of the clutch members and disconnect it from the other, a heart-shaped cam carried by the freed indicator hand, a roller adapted to contact the surface of the heart cam, a pivoted lever carrying the roller adjacent one extremity, and means for swinging the lever forcibly into engagement with the heart cam to move said cam and the freed indicator hand relatively to the other hand, said means including a rotatable cam engaging the lever.

14. In a scale and in combination with the load-offsetting mechanism thereof, indicating mechanism including a shaft adapted to be rotated upon movement of the load-offsetting mechanism, an indicator hand fixed to said shaft, a second indicator hand arranged to be driven from the shaft, means for allowing independent movement of the second indicator hand relatively to the shaft, and means for locking the shaft against movement in any adjusted position including a clutch disk carried by the shaft, a brake adapted to engage said clutch disk and secure it against rotation, and lever mechanism for throwing said brake into and out of engagement with said disk.

15. In a scale and in combination with the load-offsetting mechanism thereof, indicating mechanism including a shaft adapted to be rotated upon movement of the load-offsetting mechanism, an indicator hand fixed to said shaft, a second indicator hand arranged to be driven from the shaft, means for allowing independent movement of the second indicator hand relatively to the shaft, and means for locking the shaft against movement in any adjusted position including a clutch disk carried by the shaft, a brake adapted to engage said clutch disk and secure it against rotation, lever mechanism for throwing said brake into and out of engagement with said disk, and a rotatable cam contacting said lever mechanism and adapted to rock said lever mechanism.

16. In a scale and in combination with the load-offsetting mechanism thereof, indicating mechanism including a shaft adapted to be rotated upon movement of the load-offsetting mechanism, an indicator hand fixed to said shaft, a second indicator hand arranged to be driven from the shaft, means for allowing independent movement of the second indicator hand relatively to the shaft, and means for locking the shaft against movement in any adjusted position including a clutch disk carried by the shaft, a brake adapted to engage said clutch disk and secure it against rotation, lever mechanism for throwing said brake into and out of engagement with said disk, a rotatable cam contacting said lever mechanism and adapted to rock said lever mechanism, means for rotating the cam to rock the lever mechanism, and means for returning the cam to its original position when the cam-rotating means is released.

17. In a scale and in combination with the load-offsetting mechanism thereof, a graduated chart, a pair of indicator hands coöperating with the chart, connections therefrom to the load-offsetting mechanism whereby said hands are simultaneously actuated from the load-offsetting mechanism, means for locking one of said hands while permitting the independent movement of the other, and means for automatically returning the other indicator hand to the zero graduation of the chart, including a heart-shaped cam secured to the last-mentioned indicator hand, a roller engaging the surface of the heart-shaped cam and adapted to seat in the recess thereof when said hand is in register with the zero graduation on the chart, and means for throwing the roller forcibly into engagement with the heart cam to rotate said cam and hand.

18. In a scale and in combination with the load-offsetting mechanism thereof, a graduated chart, a pair of indicator hands coöperating with the chart, connections therefrom to the load-offsetting mechanism whereby said hands are simultaneously actuated from the load-offsetting mechanism, means for locking one of said hands while permitting the independent movement of the other, and means for automatically returning the other indicator hand to the zero graduation of the chart, including a heart-shaped cam secured to the last-mentioned indicator hand, a roller engaging the surface of the heart-shaped cam and adapted to seat in the recess thereof when said hand is in register with the zero graduation on the chart, a pivoted lever carrying said roller adjacent one extremity, and means for rocking said lever to throw the roller forcibly into engagement with the heart cam to rotate said cam and hand.

19. In a scale and in combination with the load-offsetting mechanism thereof, a graduated chart, a pair of indicator hands coöperating with the chart, connections therefrom to the load-offsetting mechanism whereby said hands are simultaneously actuated from the load-offsetting mechanism, means for locking one of said hands while permitting the independent movement of the other, and means for automatically returning the other indicator hand to the zero graduation of the chart, including a heart-shaped cam secured to the last-mentioned indicator hand, a roller engaging the surface of the heart-shaped cam and adapted to seat in the recess thereof when said hand is in register with the zero graduation on the chart, a pivoted lever carrying said roller adjacent one extremity, a rod connected with said lever intermediate its pivot and the roller, and means for drawing said rod downwardly to bring the roller into engagement with said cam to rotate said cam and hand.

20. In a scale and in combination with the load-offsetting mechanism thereof, a graduated chart, a pair of indicator hands coöperating with the chart, connections therefrom to the load-offsetting mechanism whereby said hands are simultaneously actuated from the load-offsetting mechanism, means for locking one of said hands while permitting the independent movement of the other, and means for automatically returning the other indicator hand to the zero graduation of the chart, including a heart-shaped cam secured to the last-mentioned indicator hand, a roller engaging the surface of the heart-shaped cam and adapted to seat in the recess thereof when said hand is in register with the zero graduation on the chart, a pivoted lever carrying said roller adjacent one extremity, a rod pivotally connected with said lever intermediate its pivot and the roller, and means for drawing said rod downwardly to bring the roller into engagement with said cam to rotate said cam and hand.

21. In a scale and in combination with the load-offsetting mechanism thereof, a graduated chart, a pair of indicator hands coöperating with the chart, connections therefrom to the load-offsetting mechanism whereby said hands are simultaneously actuated from the load-offsetting mechanism, means for locking one of said hands while permitting the independent movement of the other, and means for automatically returning the other indicator hand to the zero graduation of the chart, including a heart-shaped cam secured to the last-mentioned indicator hand, a roller engaging the surface of the heart-shaped cam and adapted to seat in the recess thereof when said hand is in register with the zero graduation on the chart, a pivoted lever carrying said roller adjacent one extremity, a rod connected with said lever intermediate its pivot and the roller, a bell-crank lever connected with said rod, and cam-actuating means adapted to rock said bell-crank lever to throw the roller into engagement with said cam to rotate said cam and hand.

22. In a scale and in combination with the load-offsetting mechanism thereof, a pair of indicator hands adapted to be driven from the load-offsetting mechanism, mechanism for locking one of said indicator hands in any adjusted position including a cam, means for moving the other of said indicator hands relatively to the locked indicator hand including a cam, the cams being so positioned and arranged that the locking mechanism is first actuated and then the mechanism for moving the free indicator hand.

23. In a scale and in combination with the load-offsetting mechanism thereof, a pair of indicator hands adapted to be driven from the load-offsetting mechanism, mechanism for locking one of said indicator hands in any adjusted position including a cam, means for moving the other of said indicator hands relatively to the locked indicator hand including a cam, the cams being so positioned and arranged that the locking mechanism is first actuated and then the mechanism for moving the free indicator hand, and a single means for rotating both of said cams.

24. In a scale and in combination with the load-offsetting mechanism thereof, a pair of indicator hands adapted to be driven from the load-offsetting mechanism, mechanism for locking one of said indicator hands in any adjusted position including a cam, means for moving the other of said indicator hands relatively to the locked indicator hand including a cam, the cams being so positioned and arranged that the locking mechanism is first actuated and then the mechanism for moving the free indicator hand, a single means for rotating both of said cams, and means for automatically returning the cams to their original positions when the cam-rotating means is released.

25. In a scale and in combination with the load-offsetting mechanism thereof, a pair of indicator hands adapted to be driven from the load-offsetting mechanism, mechanism for locking one of said indicator hands in any adjusted position including a cam, means for moving the other of said indicator hands relatively to the locked indicator hand including a cam, a shaft having one of said cams fixed thereon, the other of said cams loosely surrounding the shaft, and a lost motion connection between the fixed and loose cams whereby the locking mechanism is first actuated upon the rotation of the shaft and then the mechanism for moving the free indicator hand.

26. In a scale and in combination with the load-offsetting mechanism thereof, a pair of indicator hands adapted to be driven from the load-offsetting mechanism, mechanism for locking one of said indicator hands in any adjusted position including a cam, means for moving the other of said indicator hands relatively to the locked indicator hand including a cam, a shaft having one of said cams fixed thereon, the other of said cams loosely surrounding the shaft, and a pin and slot connection between the fixed and loose cams whereby the locking mechanism is first actuated upon the rotation of the shaft and then the mechanism for moving the free indicator hand.

27. In a scale and in combination with the load-offsetting mechanism thereof, indicating mechanism including a shaft adapted to be driven from the load-offsetting mechanism, an indicator hand fixed to said shaft, a second indicator hand loosely surrounding and arranged to be driven from the shaft, means for locking the shaft against rotation in any adjusted position and for rotating the second indicator hand relatively to the locked shaft, including a pair of bell-crank levers, a pair of cams respectively engaging said bell-crank levers, and means for rotating said cams.

28. In a scale and in combination with the load-offsetting mechanism thereof, indicating mechanism including a shaft adapted to be driven from the load-offsetting mechanism, an indicator hand fixed to said shaft, a second indicator hand loosely surrounding and arranged to be driven from the shaft, means for locking the shaft against rotation in any adjusted position and for rotating the second indicator hand relatively to the locked shaft, including a pair of bell-crank levers, a pair of cams respectively engaging said bell-crank levers, a shaft adapted to be turned to rotate said cams, and means for automatically returning said shaft to its original position when said turning means is released.

29. In a scale and in combination with the load-offsetting mechanism thereof, indicating mechanism including a shaft adapted to be driven from the load-offsetting mechanism, an indicator hand fixed to said shaft, a second indicator hand loosely surrounding and arranged to be driven from the shaft, means for locking the shaft against rotation in any adjusted position and for rotating the second indicator hand relatively to the locked shaft, including a pair of bell-crank levers, a pair of cams respectively engaging said bell-crank levers, a shaft adapted to be turned to rotate said cams, and means for automatically returning said shaft to its original position when said turning means is released, comprising a spring having one end fixed to said shaft and the other end secured to a fixed part of the scale.

30. In a scale and in combination with the load-offsetting mechanism thereof, a pair of indicator hands, connections therefrom to the load-offsetting mechanism whereby said hands are simultaneously actuated from the load-offsetting mechanism, means for manually operating the load-offsetting mechanism to move both of the indicator hands to any adjusted position, and means for locking one of said indicator hands in the adjusted position while permitting the indepent movement of the other indicator hand.

31. In a scale and in combination with the load-offsetting mechanism thereof, a pair of indicator hands, connections therefrom to the load-offsetting mechanism whereby said hands are simultaneously actuated from the load-offsetting mechanism, means for manually operating the load-offsetting mechanism to move both of the indicator hands to any adjusted position, and means for locking one of said indicator hands in the adjusted position while permitting the independent movement of the other indicator hand, said manual operating means comprising a lever adapted to be rocked into engagement with a portion of the load-offsetting mechanism, and means for rocking said lever.

32. In a scale and in combination with the load-offsetting mechanism thereof, a pair of indicator hands, connections therefrom to the load-offsetting mechanism whereby said hands are simultaneously actuated from the load-offsetting mechanism, means for manually operating the load-offsetting mechanism to move both of the indicator hands to any adjusted position, and means for locking one of said indicator hands in the adjusted position while permitting the independent movement of the other indicator hand, said manual operating means including a bell-crank lever, one arm of which is adapted to contact a portion of the load-offsetting mechanism, and means engaging the other arm of the lever to rock the lever.

33. In a scale and in combination with the load-offsetting mechanism thereof, a pair of indicator hands, connections therefrom to the load-offsetting mechanism whereby said hands are simultaneously actuated from the load-offsetting mechanism, means for manually operating the load-offsetting mechanism to move both of the indicator hands to any adjusted position, and means for locking one of said indicator hands in the adjusted position while permitting the independent movement of the other indicator hand, said manual operating means including a bell-crank lever, one arm of which is adapted to contact a portion of the load-offsetting mechanism, a threaded member carried by the other arm of said lever, a threaded shaft engaging with said member, and means for rotating said shaft to rock the lever.

34. In a scale and in combination with the load-offsetting mechanism thereof, a pair of indicator hands, connections therefrom to the load-offsetting mechanism whereby said hands are simultaneously actuated from the load-offsetting mechanism, means for manually operating the load-offsetting mechanism to move both of the indicator hands to any adjusted position, and means for locking one of said indicator hands in the adjusted position while permitting the independent movement of the other indicator hand, said manual operating means including a bell-crank lever, one arm of which is adapted to contact a portion of the load-offsetting mechanism, a threaded member carried by the other arm of said lever, a threaded shaft engaging with said member, and means for automatically returning the shaft to its original position when the shaft-rotating means is released.

35. In a scale and in combination with the load-offsetting mechanism thereof, a pair of indicator hands, connections therefrom to the load-offsetting mechanism whereby said hands are simultaneously actuated from the load-offsetting mechanism, means for manually operating the load-offsetting mechanism to move both of the indicator hands to any adjusted position, and means for locking one of said indicator hands in the adjusted position while permitting the independent movement of the other indicator hand, said manual operating means including a bell-crank lever, one arm of which is adapted to contact a portion of the load-offsetting mechanism, a threaded member carried by the other arm of said lever, a threaded shaft engaging with said member, and means for automatically returning the shaft to its original position when the shaft-rotating means is released, said returning means including a spring having one end fixed to the shaft and its other end secured to a fixed part of the scale.

HALVOR O. HEM.

Witnesses:
F. A. CROWLEY,
FRANCES S. DOYLE.